United States Patent Office 3,257,920
Patented June 28, 1966

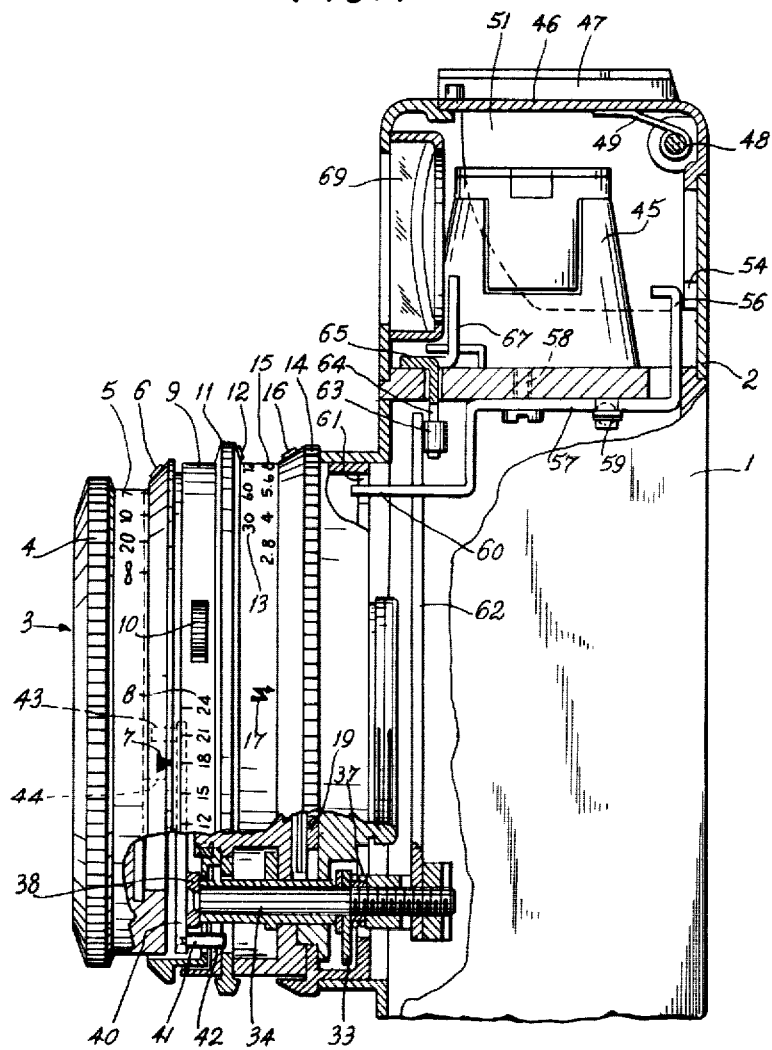

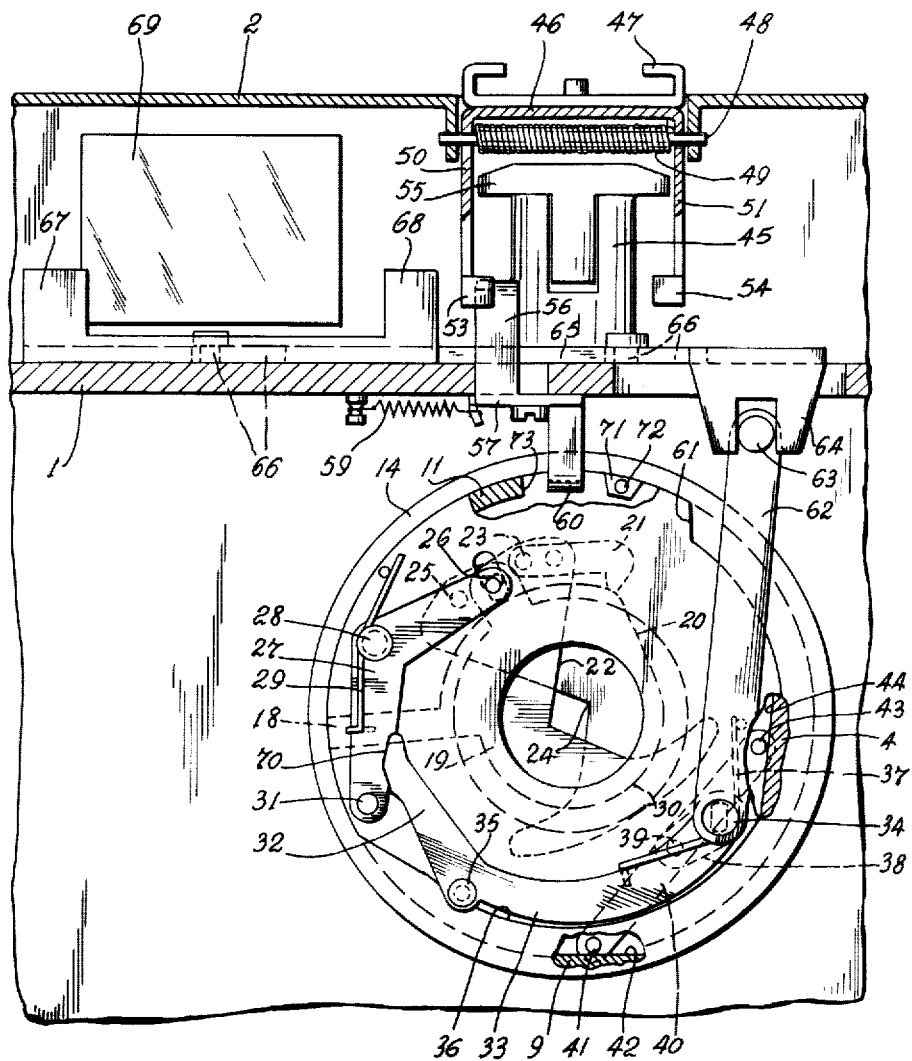

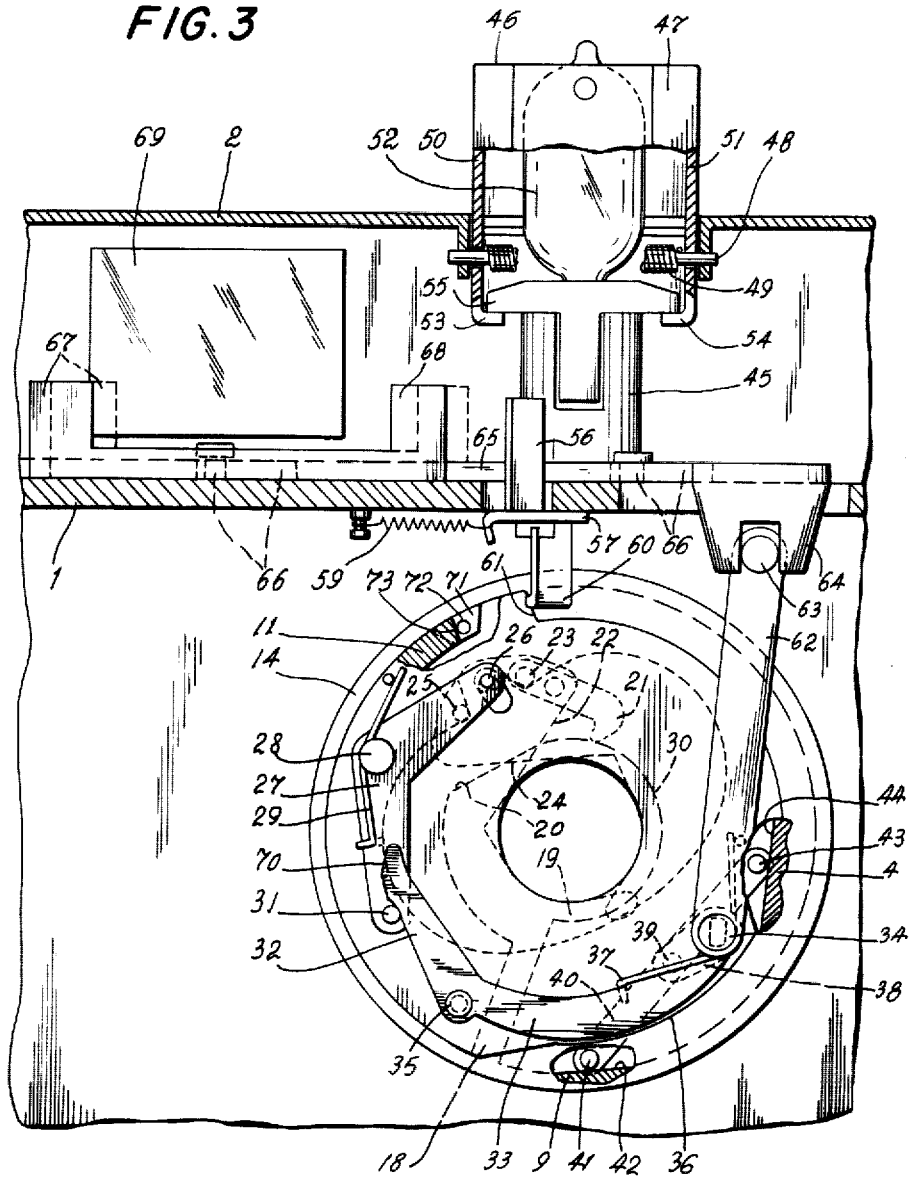

3,257,920
CAMERA WITH BUILT-IN FLASH ASSEMBLY
Paul Greger, Braunschweig, and Herbert Weidner, Steinkamp, Germany, assignors to Voigtlander, A.G., Braunschweig, Germany, a corporation of Germany
Filed Oct. 9, 1964, Ser. No. 402,797
Claims priority, application Germany, Oct. 26, 1963, V 24,765
4 Claims. (Cl. 95—11)

The present invention relates to cameras.

It is known to provide cameras with a structure for manually setting the diaphragm as well as a structure for automatically setting the diaphragm according to a given flash guide number by coupling the diaphragm to the structure which sets the objective to provide a given distance between the camera and the object which is to be photographed.

Also, it is known to provide cameras with built-in flash structures capable of being displaced between operative and inoperative positions.

With cameras which include these latter features it can sometimes happen that the flash structure is placed by the operator in its operative position while the diaphragm-setting structure is still in a position for manually setting the diaphragm or is in a position to be automatically set by light-responsive structure capable of setting the diaphragm according to the lighting conditions, so that under these circumstances where the operator neglects to couple the diaphragm to the distance setting structure of the objective improper exposures will be made.

It is therefore an object of the present invention to provide a structure which will avoid this drawback.

In particular, it is an object of the present invention to provide a structure which will automatically result in displacement of a flash structure from its inoperative to its operative position when the diaphragm-setting means is displaced to a non-adjusting position where the diaphragm cannot be manually adjusted but instead can only be adjusted automatically in response to manipulation of the distance setting means of the objective. Therefore, with this structure of the invention it is not possible to render the flash structure operative unless the diaphragm is coupled to the distance setting structure of the objective, and therefore it cannot happen that improper flash exposures will be made.

In particular, it is an object of the present invention to provide for a camera of the above type a built-in flash structure which is releasably locked against movement to its operative position and in which the releasable locking structure can only be actuated to release the flash structure for movement to its operative position when the diaphragm-setting means is displaced by the operator to a non-adjusting position where the diaphragm cannot be adjusted by the diaphragm-setting means and where the diaphragm is coupled with the distance setting means so that this latter coupling and the release of the flash structure for movement to its operative position take place simultaneously in response to movement of the diaphragm-setting means to its non-adjusting position referred to above.

The invention is illustrated by way of example in the accompanying drawings which form part of the application and in which:

FIG. 1 is a partly sectional side view of one possible structure of a camera according to the present invention;

FIG. 2 is a fragmentary partly sectional rear view of the camera of FIG. 1 showing the parts in a position where the diaphragm is capable of being manually adjusted; and FIG. 3 is a rear view of the camera of FIG. 1 showing the same parts as those of FIG. 2 but in a position where the diaphragm is capable of being automatically adjusted in accordance with the combination of settings for film speed and distance between the camera and the object to be photographed.

Referring now to the drawings, there is shown therein a camera housing 1 provided at its upper part with a cap 2 which cooperates with the top wall of the camera housing 1 to provide a chamber in which a viewfinder and a built-in flash assembly are located. The camera also includes an objective unit 3 which includes the structure for carrying lenses of the objective as well as the structure for carrying a between-the-lens shutter. The objective assembly 3 includes a distance setting means 4 in the form of a rotary ring having a scale 5 of distance settings, this scale 5 cooperating with a stationary index 6. The stationary objective structure which carries the stationary index 6 also carries a stationary index 7 with which a scale 8 of film speeds cooperates, this scale 8 being carried by a rotary adjusting ring 9 which forms a film speed setting means and which is set by the operator to align that graduation of the scale 8 with the index 7 which corresponds to the speed of the film which is to be exposed in the camera. The adjusting ring 9 carries a plurality of knurled projections 10 to make it convenient for the operator to turn the film speed setting means 9. The objective assembly 3 also includes an exposure time setting ring 11 which has an index 12 capable of cooperating with a stationary scale 13 of exposure times. Also, the objective assembly includes a diaphragm-setting means in the form of a rotary ring 14 which carries an index 16 which is adjustable with respect to the scale 15 of the diaphragm apertures. The range of the scale 15 forms a manually operable setting range for the diaphragm-setting means 14, and as long as the index 16 is situated in the range of the scale 15 it is possible for the operator to manually set the diaphragm. The diaphragm-setting means 14, however, has an additional non-adjusting position situated beyond the manually operable range determined by the scale 15, and in this non-adjusting position of the diaphragm-setting means it is not possible for the operator to manually set the diaphragm. The stationary part of the objective which carries the stationary scales 13 and 15 carries a flash symbol 17 with which the index 16 is aligned in order to place the diaphragm-setting means 14 in its non-adjusting position.

Referring now to FIGS. 2 and 3, it will be seen that the rotary diaphragm adjusting ring 14 is fixed with a radially extending arm 18 which projects radially from the ring 14 inwardly toward the optical axis, and the inner end of the arm 18 fixedly carries a cam 19 which surrounds the optical axis. The annular cam 19 which surrounds the optical axis turns with the ring 14 above the optical axis and is provided at its outer periphery with a camming edge 20. This cam forms part of a transmission means for transmitting movement of the diaphragm-setting means 14 to the diaphragm for setting the latter when the diaphragm-setting means 14 is in its manually operable range, and this transmission means also includes a cam-follower 21 which has a free end engaging the camming edge 20 and which is fixed to one of the diaphragm blades 22. The particular diaphragm illustrated in the drawings includes a pair of diaphragm blades 22 and 24, and the blade 22 is supported for turning movement about a stationary pivot pin 23 which also forms the pivot axis for the cam-follower 21. The second diaphragm blade 24 is supported for turning movement by a stationary pivot pin 25, these pivots being carried by a suitable stationary transverse wall of the objective assembly in a manner well known in the art. Both of the blades 22 and 24 are formed with substantially V-shaped notches which overlap each other to provide the diaphragm aperture in the manner shown in the drawings. In addition, the blades 22 and 24 are formed with overlapping control slots which receive a pin 26 which extends through these overlapping control slots in such a way that turning of the blade 22 will provide through the pin 26 equal and opposite turning of the blade 24. In this way the blades 22 and 24 are coupled to each other so as to determine the aperture of the diaphragm. This pin 26 also forms part of the transmission means for setting the diaphragm, and this transmission means further includes a transmission lever 27 which at one end fixedly carries the pin 26 and which is supported for turning movement by a stationary pivot pin 28 which at the same time supports a spring 29 which at one end engages the lever 27 to urge the latter to turn in a counterclockwise direction, as viewed, in FIGS. 2 and 3. This tendency of the lever 27 to be turned by the spring 29 in a counterclockwise direction urges the pin 26 away from the optical axis with result that the pin 26 acts on the overlapping slots of the blades to urge the blade 22 in a clockwise direction and the blade 24 in a counterclockwise direction, so that the spring 29 acts on the transmission means to tend to provide the largest possible aperture, and it is this direction of turning of the blade 22 in the direction providing the largest with the camming edge 20.

The parts are illustrated in FIG. 2 in the position they take when the transmission means has been acted upon by the diaphragm-setting means 14 to provide through the cam 19 and the cam-follower 21 as well as the blade 22 the smallest possible diaphragm aperture. When the ring 14 is turned in a counterclockwise direction, as viewed in FIG. 2, the cam 19 will also turn in a counterclockwise direction with the result that the spring 29 will act on the cam-follower 21 to turn the latter together with the blade 20 in a clockwise direction, as viewed in FIG. 2, so that in this way the diaphragm aperture is increased, and the continued turning of the ring 14 through its manually operable range is capable of providing the largest possible aperture, and in this manner the cooperation of the index 16 with the scale 15 will provide selected apertures.

When the diaphragm-setting means 14 is turned beyond the largest possible aperture setting of the scale 15 so as to displace the index 16 into alignment with the flash symbol 17, a portion 30 of the camming edge 20 engages the cam-follower 21, and this portion 30 extends along a circle whose center is in the optical axis about which the cam ring 19 turns, so that when the camming edge portion 30 engages the cam-follower 21 it will not be possible to provide any change in the setting of the diaphragm by movement of the diaphragm-setting means 14. Thus, alignment of the index 16 with the symbol 17 locates the diaphragm-setting means in its non-adjusting position, and this is the position of the parts which is illustrated in FIG. 3.

The displacement of the diaphragm-setting means 14 from its manually operable range to its non-adjusting position where the index 16 is aligned with the flash symbol 17 results not only in situating the diaphragm at its fully open position, but in addition this movement results, in a manner described below, in coupling the diaphragm blades 22 and 24 with the structure for setting the objective at a given distance between the camera and the object to be photographed and with the structure for setting into the camera the factor of the speed of the film which is situated therein, so that as a result of this coupling it is possible to automatically adjust the diaphragm, when the diaphragm-setting means 14 is in its non-adjusting position, in a manner which will provide proper exposures for the particular flash guide number.

When the diaphragm is manually set at its largest aperture, the lever 27 turns about the pivot 28 to a position where a portion 31 of the transmission lever 27, in the form of a pin fixed to an extension therefrom, comes into engagement with an edge portion of an arm of a coupling lever 33 which forms a coupling means for coupling the transmission means to the distance setting and the speed setting means. The elongated coupling lever 33 is fixed to a shaft 34 which extends parallel to the optical axis and which is supported for rotary movement by the objective assembly in the manner shown most clearly at the lower part of FIG. 1. The coupling lever 33 supports for angular adjustment a pin 35 which has an eccentric portion engaging, in the position of the part shown in FIG. 2, a camming edge 36 which forms part of the diaphragm-setting ring 14. This camming portion 36 of the diaphragm-setting means 14 remains in engagement with the eccentric portion of the pin 35 as long as the diaphragm-setting means is in its manually operable range where the index 16 cooperates with the scale 15, and at this time the cam 36 cooperates with the pin 35 to maintain the coupling lever 32 beyond the range of movement of the pin 31 of the transmission lever 27, so that as long as the diaphragm-setting means 14 is in its manually operable range it is not possible for the diaphragm adjustment to be influenced by the coupling lever 33. A spring means formed by a spring 37 which surrounds the rotary shaft 34 engages with one of its arms an edge of the coupling lever 33 to urge the latter and the shaft 34 in a counterclockwise direction, as viewed in FIGS. 2 and 3, and thus this spring means 37 maintains the pin 35 in engagement with the cam 36 of the diaphragm-setting means 14. When the diaphragm-setting means 14 is displaced to the non-adjusting position shown in FIG. 3, the cam portion of the diaphragm-setting means moves beyond the range of the pin 35, and now the coupling lever 33 together with the shaft 34 are free to turn so that the arm 32 will engage the pin 31 and turn the lever 27. The turning of the lever 27 at this time by the coupling lever 33 will result in displacement of the pin 26 so that by cooperation of the overlapping slots of the blades 22 and 24 it is possible for the displacement of the pin 26 to control the position of the blades 22 and 24 and thus determine the size of the diaphragm aperture. During this time the cam-follower 21 will move through a greater or lesser distance away from the camming edge 30 of the ring 19 depending upon the degree to which the lever 27 is turned by the coupling means 33.

The angular position of the shaft 34 and the coupling lever 33, which determines the diaphragm-setting when the index 16 is aligned with the symbol 17, is automatically determined by a differential means capable of providing for the shaft 34 and the lever 33 an angular position in accordance with the combined positions of the distance setting means 4 and the film speed setting means 9.

For this purpose the shaft 34 fixedly carries an arm 38 which in turn carries a pivot pin 39 which serves to support for turning movement a differential lever 40 which forms part of the differential means for combining the settings of the distance and film speed to determine from this combination the angular position of the lever 33 and thus the angular position of the lever 27 so as to automatically determine the diaphragm-setting. The differential means includes in addition to the differential lever 40 a pair of cam-follower portions in the form of pins 41 and 43 fixed to and projecting from the lever 40 in directions parallel to the optical axis. The film speed setting ring 9 fixedly carries a cam 42 which is engaged by the cam-follower pin 41 of the differential means, and thus the cam 42 will cooperate with the pin 41 for imparting to the differential lever 40 a position determined by the film speed setting. The pin 43 engages a cam 44 which is fixed to the distance setting ring 4 of the objective assembly 3, so that the cooperation of the cam 44 with the pin 43 will impart to the differential lever 40 an angular position according to the distance setting of the objective. The spring 37 serves not only to urge the lever 33 and the shaft 34 in a counterclockwise direction, as viewed in FIGS. 2 and 3, in addition this spring acts through the shaft 34 and the arm 38 on the lever 40 for maintaining the cam-follower pins 41 and 43 respectively in engagement with cams 42 and 44.

The turning of the film speed adjusting ring 9 will cause the cam 42 to act on the pin 41 and the lever 40 to provide a corresponding position for the latter. With a subsequent adjustment of the distance setting ring 4 the cam 44 will move so as to act on the pin 43. The result is that the lever 40 turns about the position determined by the location of the pin 41 on the cam 42. As a result the location of the pivot 39 of the lever 40 will change, so that the arm 38 will turn and will provide a corresponding turning of the shaft 34. This turning of the shaft 34 will of course result in turning of the coupling lever 33 which will in turn move the transmission lever 27 so as to result in a change in the setting of the diaphragm, and the diaphragm-setting will of course correspond to the setting of the film speed and the distance setting, this diaphragm-setting of course being determined in accordance with the light intensity of a predetermined flash lamp. The change in the distance setting will change in the above-described manner the diaphragm setting in a manner which will correspond to the flash guide number. If the film speed setting means 9 is adjusted, there is also a corresponding change in the diaphragm-setting, since at this time the lever 40 is turned about the position determined by the location of the pin 43 at the cam 44, as a result of the displacement of the cam 42 and the pin 41 with respect to each other. Therefore, the position of the pivot 39 will also change at this time to provide a corresponding change in the angular position of the shaft 34 which will result in the above-described manner in a change in the diaphragm-setting.

If the diaphragm-setting means 14 is returned from the position of FIG. 3 into the position of FIG. 2, then the camming edge 36 will again engage the eccentric pin 35 so as to displace the coupling lever 33 to a position situating its arm 32 at a location corresponding to the largest possible opening of the diaphragm, and thus the coupling lever 33 at this time, and of course all of the parts connected therewith, cannot participate in the setting of the diaphragm. The setting of the diaphragm now will take place only in accordance with the manual turning of the ring 14 along its manually operable range, as a result of cooperation of the camming edge 20 with the cam-follower 21.

The camera of the invention has a built-in flash means. This flash structure includes a lamp socket 45 situated within the cap 2. The opening at the top of the cap through which the flash lamp is introduced into the lamp socket 45 is closed by a swingable cover 46 when the flash structure is in an inoperative position, this swingable cover 46 carrying a shoe 47. The cover 46 is supported for pivotal movement by an elongated rod 48 which is supported by lugs of the top wall of the cap 2. A spring 49 is coiled about the rod 48 and seeks to turn the cover 46 into the open, operative position thereof illustrated in FIG. 3, and to maintain the cover 46 in the operative position of FIG. 3. The inner surface of the cover 46 forms together with the side walls 50 and 51 of the cover a reflector for the lamp 52 which is set into the socket 45. In order to limit the opening movement of the cover 46, the side walls 50 and 51 are respectively provided with inwardly directed lugs 53 and 54 which engage the underside of a flange 55 of the socket 45, and the parts are shown in this position in FIG. 3. In its closed position which is shown in FIGS. 1 and 2, the cover 46 is releasably maintained in its closed, inoperative position by a releasable lock means, as is particularly apparent from FIG. 2 which shows how the lug 53 is engaged by a lock arm 56 to prevent the spring 49 from turning the cover 46 from its inoperative to its operative position. The lock arm 56 forms part of a lock lever 57 of the releasable lock means, this lever 57 being supported for turning movement by a suitable pivot 58 which is shown in FIG. 1, and a spring 59 is connected to the lever 57 so as to urge the latter into its locking position where the arm 56 engages the lug 53 to prevent the flash means from assuming its operative position. A second arm 60 extends downwardly from the lock lever 57 and is situated in the path of movement of a projection 61 of the diaphragm-setting ring 14, so that when this ring 14 is turned to displace the index 16 in alignment with the flash symbol 17, the projection 61 engages the arm 60 so as to turn the lock lever 57 in opposition to the spring 59 to a position in which the lock arm 56 is displaced beyond the lug 53 so as to release the cover 46 to the spring 49 which now snaps the cover up to its operative position shown in FIG. 3.

Thus, the snapping of the cover 46 to its operative position renders the flash means operative, and this operation will automatically take place whenever the diaphragm-setting means 14 is turned beyond its manually operable range to its non-adjusting position where the index 16 is aligned with the flash symbol 17. In order to return the parts to their inoperative position, the operator will depress the cover 46 in opposition to the spring 49 to the position indicated in FIG. 2, and then the operator will turn the ring 14 so that its index 16 is situated in the manually operable adjusting range determined by the scale 15, and the result is that the projection 61 will move away from the arm 60 so that the spring 59 will be capable of displacing the lock arm 56 in front of the lug 53 to maintain the flash means in its inoperative position.

The above-described structure for adjusting the diaphragm is also coupled with an indicating means which is capable of indicating, when the index 16 is aligned with the symbol 17, those positions of the distance setting means or film speed setting means which will require diaphragm-settings which cannot be made by the camera.

As is apparent from the drawings, the shaft 34, in addition to being connected with the coupling lever 33 and the arm 38, is also fixed with an adjusting lever 62. This lever 62 carries at its upper end a pin 63 which is received in a notch of a lug 64 of an elongated slide member 65 which is guided for horizontal movement to the right and left, as viewed in FIGS. 2 and 3 by a suitable pin-and-slot guiding structure 66. The elongated slide member 64 is supported by the top wall of the camera housing within the cap 2, and the slide member 65 carries a pair of warning lugs 67 and 68 which are so positioned that in given positions of the slide member 65 one or the other of these lugs will be visible in the viewfinder of the camera. FIG. 3 shows in dotted lines a position of the slide 65 where the warning lug 67 overlaps the lens 69 of the viewfinder.

The slide 65 is shifted by the lever 62 in accordance with the angular position of the shaft 34.

As may be seen from FIGS. 2 and 3, the diaphragm-setting ring 14 carries an additional lug 71 which in turn carries a motion-transmitting pin 72. The exposure time setting ring 11 has a stop surface or shoulder 73 which is situated in the path of turning of the pin 72 when the diaphragm-setting means 14 is displaced beyond the manually operable range to the non-adjusting position. Thus, when the operator turns the index 16 beyond the scale 15 to the symbol 17, the pin 72 engages the shoulder 73 of the exposure time setting ring 11 so as to turn the latter together with the diaphragm-setting ring 14. In this way the exposure time setting ring 11 will be turned together with the diaphragm-setting ring 14 when the latter is displaced to its non-adjusting position. The position of the pin 72 and the stop shoulder 73 are so chosen that when the index 16 is in alignment with the flash symbol 17, the exposure time setting ring 11 will provide an exposure time of a predetermined value, preferably 1/10 sec. This exposure time setting ring 11 therefore is displaced out of whichever setting it previously had into this predetermined setting when the diaphragm-setting means is displaced to its non-adjusting position.

What is claimed is:

1. In a camera, an objective having a distance setting means for setting the objective according to the distance between the camera and an object to be photographed thereby, diaphragm-setting means having a manually operable range and a non-adjusting position situated beyond said manually operable range, a diaphragm, means for adjusting said diaphragm with said diaphragm-setting means only when the latter is in said manually operable range thereof and for adjusting said diaphragm with said distance setting means when said diaphragm-setting means is in said non-adjusting position thereof, flash means movable between operative and inoperative positions, and means automatically displacing said flash means from said inoperative to said operative position thereof when said diaphragm-setting means is moved to said non-adjusting position thereof, so that said flash means becomes automatically operative when the diaphragm is automatically adjusted with said distance setting means.

2. In a camera as recited in claim 1, said flash means including a reflector turnable between operative and inoperative positions, releasable lock means engaging said reflector for maintaining the latter in said inoperative position thereof, and said diaphragm-setting means having a projection engaging said releasable lock means and displacing the latter to a position releasing said reflector for movement from said inoperative to said operative position thereof when said diaphragm-setting means is displaced to said non-adjusting position thereof.

3. In a camera as recited in claim 2, said releasable lock means having an arm situated in the path of movement of said projection of said diaphragm-setting means to be engaged and moved thereby for releasing said reflector for movement to said operative position thereof when said diaphragm-setting means is displaced to said non-adjusting position thereof.

4. In a camera as recited in claim 3, said releasable lock means including a locking lever carrying said arm and carrying a second arm, said reflector having a lug held by said second arm of said lever in a position preventing movement of said reflector to said operative position thereof, said projection of said diaphragm-setting means when engaging said first-mentioned arm of said lever turning the latter in a direction displacing said second arm thereof away from said lug of said reflector to release the latter for movement to said operative position thereof.

References Cited by the Examiner

UNITED STATES PATENTS 3,127,824   4/1964   Williams _____ 95—10

JOHN M. HORAN, *Primary Examiner.*